(12) United States Patent
Sung et al.

(10) Patent No.: US 9,780,925 B2
(45) Date of Patent: Oct. 3, 2017

(54) ACCESS POINT WITH CAPABILITY OF DYNAMICALLY ADJUSTING CURRENT CLEAR CHANNEL ASSESSMENT THRESHOLD VALUE AND OPERATING METHOD THEREOF

(71) Applicant: ACCTON TECHNOLOGY CORPORATION, Hsinchu (TW)

(72) Inventors: Chien-Fu Sung, New Taipei (TW); Tan-Chun Lu, New Taipei (TW)

(73) Assignee: ACCTON TECHNOLOGY CORPORATION, Hsinchu (TW)

(*) Notice: Subject to any disclaimer, the term of this patent is extended or adjusted under 35 U.S.C. 154(b) by 565 days.

(21) Appl. No.: 14/089,773

(22) Filed: Nov. 26, 2013

(65) Prior Publication Data

US 2015/0032868 A1    Jan. 29, 2015

(30) Foreign Application Priority Data

Jul. 26, 2013  (TW) .............................. 102126947 A

(51) Int. Cl.
*G06F 15/16* (2006.01)
*H04L 1/20* (2006.01)
*H04L 1/00* (2006.01)

(52) U.S. Cl.
CPC ............ *H04L 1/203* (2013.01); *H04L 1/0021* (2013.01); *H04L 1/0002* (2013.01)

(58) Field of Classification Search
CPC ..... H04L 43/16; H04L 1/0003; H04L 1/0009; H04L 1/00; H04L 1/0001; H04L 27/3405; H04L 43/08; H04L 1/0002; H04L 1/0021; H04L 1/203; H04L 27/2646; H04L 47/25
See application file for complete search history.

(56) References Cited

U.S. PATENT DOCUMENTS

| 7,620,063 B2 | 11/2009 | Cave et al. |
| 7,623,494 B2 | 11/2009 | Zhu et al. |
| 2004/0047305 A1* | 3/2004 | Ulupinar ............ H04W 52/125 370/320 |

(Continued)

FOREIGN PATENT DOCUMENTS

| CN | 1977479 A | 6/2007 |
| CN | 101253784 A | 8/2008 |
| CN | 103220065 A | 7/2013 |

*Primary Examiner* — Lance L Barry
(74) *Attorney, Agent, or Firm* — CKC & Partners Co., Ltd.

(57) ABSTRACT

An access point with capability of dynamically adjusting a present clear channel assessment (CCA) threshold value and an operating method of the access point are disclosed herein. The operating method includes, sensing a channel status through a receiving module, determining whether to transmit data through a transmission module according to the channel status and the present CCA threshold value, calculating a transmission error rate according to the data is successfully transmitted through the transmission module or not, determining a minimum received signal strength indicator (RSSI) value from a plurality of RSSI values corresponding to the workstations to serve as an upper bound of CCA threshold value and dynamically adjusting the present CCA threshold value according to the transmission error rate and the upper bound of CCA threshold value.

15 Claims, 6 Drawing Sheets

(56) References Cited

U.S. PATENT DOCUMENTS

| | | | | |
|---|---|---|---|---|
| 2004/0203423 | A1* | 10/2004 | Kurhila | H04W 24/00 455/67.11 |
| 2008/0008133 | A1* | 1/2008 | Zhu | H04W 72/085 370/332 |
| 2008/0238629 | A1* | 10/2008 | Gonikberg | H04L 1/0002 340/10.4 |
| 2009/0034474 | A1* | 2/2009 | Yavuz | H04L 1/0007 370/331 |
| 2010/0165846 | A1* | 7/2010 | Yamaguchi | H04B 7/15592 370/236 |
| 2012/0011413 | A1* | 1/2012 | Liu | H04L 1/0009 714/746 |

* cited by examiner

US 9,780,925 B2

ACCESS POINT WITH CAPABILITY OF DYNAMICALLY ADJUSTING CURRENT CLEAR CHANNEL ASSESSMENT THRESHOLD VALUE AND OPERATING METHOD THEREOF

RELATED APPLICATIONS

This application claims priority to Taiwan Application Serial Number 102126947, filed Jul. 26, 2013, which is herein incorporated by reference.

BACKGROUND

Technical Field

The present disclosure relates to a network device and an operating method thereof. More particularly, the present invention relates to an access point with capability of dynamically adjusting clear channel assessment (CCA) threshold value and an operating method thereof.

Description of Related Art

With advances in network technology, various kinds of network devices, such as routers or access points, are widely used in our daily lives.

Typically, an access point is configured to establish a wireless network. Workstations (e.g., computers) located in a cell size of the access point can connect to each other or connect to the Internet through the access point.

In a traditional business network, a plurality of access points are employed in a specific area, to separately provide wireless network services to a plurality of workstations, so as to improve the throughput of the wireless network. However, in such a configuration, the access points may continually detect wireless signals from the workstations located beyond the cell sizes of themselves or wireless signals from each other, such that the access point may esteem the transmission channel is occupied and accordingly abandon the transmission tasks. As a result, the workstations still can not transmit data in the same period. In a worst case, only one access point in the specific area can process the transmission task in one period, and therefore, the throughput of the wireless network can not be improved even multiple access points are employed.

Thus, there is an urgent need in the field to avoid the data transmission tasks of the access points being interfered, so as to improve the service quality of the wireless network.

SUMMARY

One aspect of the present invention is directed to an operating method. In accordance with one embodiment of the present invention, the operating method is applied to an access point. The access point is configured to be connected with a plurality of workstations. The access point includes a transmission module and a receiving module. The operating method includes, sensing, through the receiving module, a channel status of a transmission channel between the access point and the workstations; determining whether to process a data transmission task through the transmission module according to the channel status and a present clear channel assessment (CCA) threshold value; calculating, through the transmission module, a transmission error rate according to the fact that the data transmission task succeeds or not; and dynamically adjusting the present CCA threshold value according to the transmission error rate.

Another aspect of the present invention is directed to an access point. In accordance with one embodiment of the present invention, the access point is configured to be connected with a plurality of workstations. The access point includes a receiving module, a transmission module, and a control module. The receiving module is configured to sense a channel status of a transmission channel between the access point and the workstations. The transmission module is configured to process a data transmission task and calculate a transmission error rate according to the fact that the data transmission task succeeds or not. The control module is configured for determining whether to process the data transmission task through the transmission module according to the channel status and a present CCA threshold value, and dynamically adjusting the present CCA threshold value according to the transmission error rate.

Thus, through application of one of the embodiments mentioned above, the present CCA threshold value can be adjusted to a suitable value, and the access point can avoid abandoning its data transmission task due to the interferences of wireless signals from other access points or workstations located beyond a cell size of the access point. With such an operation, the service quality of the wireless network can be effectively improved.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
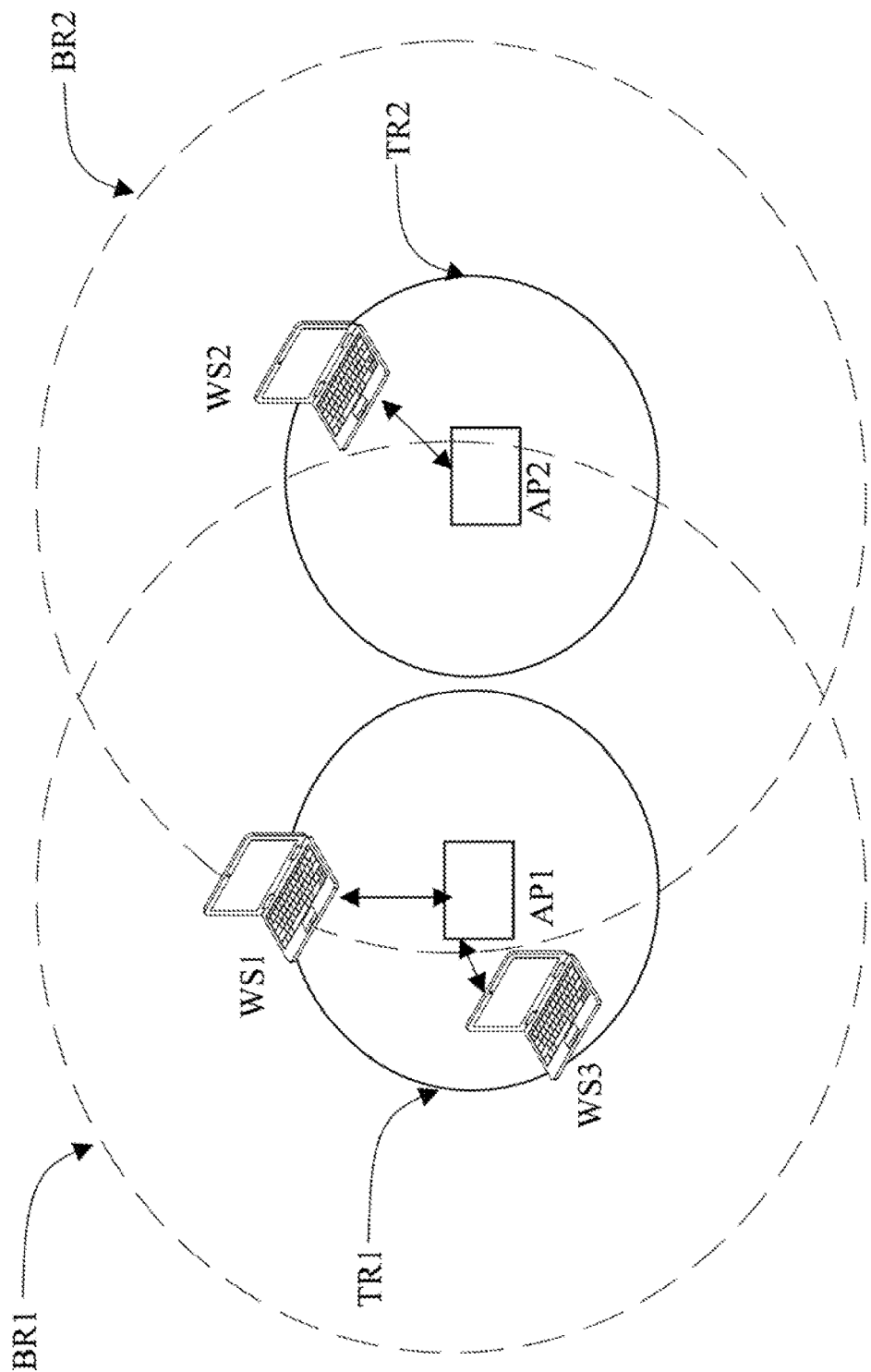
FIG. 1 is a diagram illustrating a wireless network system including access points in accordance with one exemplary embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

One aspect of the present disclosure is an access point. The access point can be a wireless base station, but is not limited in this particular device. The access point is configured to process data transmissions through wireless signals. The access point, for example, conforms to Electrical and Electronics Engineers (IEEE) 802.11 standard, but is not limited in this regards.

Figure 2:
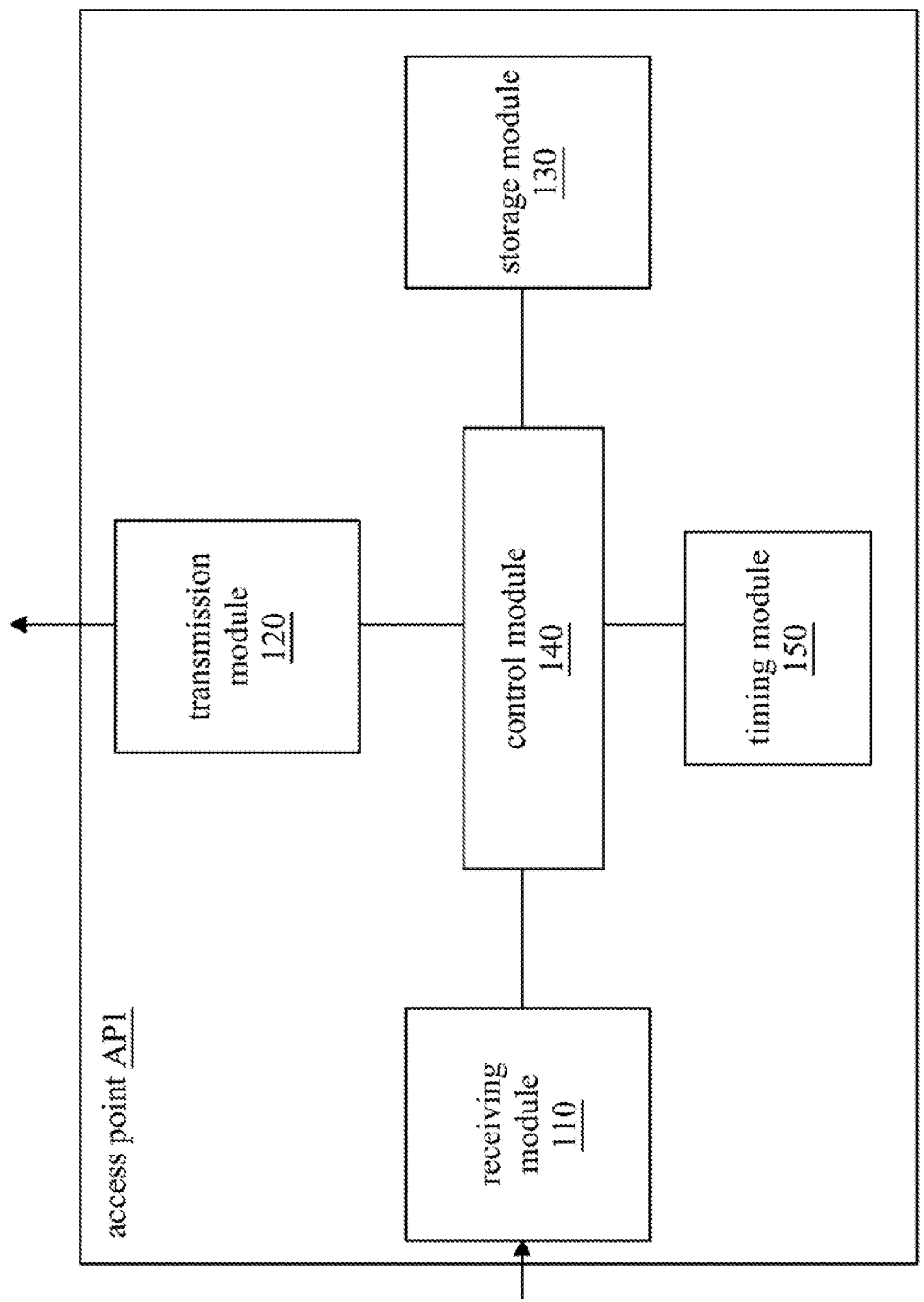
FIG. 2 is a schematic diagram of the access point in accordance with one embodiment of the present disclosure.

Reference is now made to FIG. 1 and FIG. 2, in which FIG. 1 is a diagram illustrating a wireless network system including access points in accordance with one exemplary embodiment of the present disclosure, and FIG. 2 is a schematic diagram of the access point in accordance with one embodiment of the present disclosure.

In this exemplary embodiment, the wireless network system includes access points AP1 and AP2, and workstations WS1, WS2 and WS3. The access point AP1 bi-directionally communicates with the workstation WS1 and the workstation WS3. The access point AP2 bi-directionally communicates with the workstation WS2. The transmission channel for communication between the access point AP1 and the workstation WS1 and the workstation WS3 and the transmission channel for communication between the access point AP2 and the workstation WS2 are the same (e.g., having the same frequency range).

In one embodiment, the access point AP1 includes a receiving module 110, a transmission module 120, a storage module 130, a control module 140, and a timing module 150. The control module 140 is electrically connected to the receiving module 110, the transmission module 120, the storage module 130, and the timing module 150 separately. In one embodiment, the structure of the access point AP2 is the same as the access point AP1, but is not limited in this particular form. In addition, it should be noted that the quantities of the access points and the workstations in the wireless network system are not limited to the quantities in the exemplary embodiment above. Moreover, the connections among the modules in the access point AP1 are not limited by the embodiment above, and any connection configuration enabling the AP1 to practice the technical features described below can be used herein.

In this embodiment, the receiving module 110 and the transmission module 120, for example, can be realized by electronic circuits, but is not limited in this regard. The storage module 130, for example, can be realized by a storage device such as a hard disk, a memory, and a portable storage media, but is not limited in this regard. The control module 140, for example, can be realized by a processing device, such as a central processor, a microprocessor, and a programmable logic device, and a field-programmable gate array (FPGA), but is not limited in this regard. The timing module 150, for example, can be realized by an electronic circuit or software, but is not limited in this regard.

In this embodiment, the receiving module 110 is configured to receive wireless signals from external devices (e.g., the access point AP2, the workstation WS1, the workstation, WS2, and the workstation WS3), and transmit the wireless signals to the control module 140. In addition, the receiving module 110 is configured to sense a channel status (or a media status) of the transmission channel of said wireless signals between the access point AP1 and the external devices, and transmit the channel status to the control module 140.

The control module 140 is configured to receive the wireless signals from the receiving module 110, generate a transmission packet, and store the transmission packet to the storage module 130. In addition, the control module 140 is configured to receive the channel status from the receiving module 110, and determine whether to process a data transmission task to transmit the transmission packet stored in the storage module 130 to at least one of the external devices (e.g., the access point AP2, the workstation WS1, the workstation, WS2, and the workstation WS3).

The transmission module 120 is configured to transmit the transmission packet stored in the storage module 130 to the external devices, and determine whether the data transmission task of the transmission packet succeeds or not (i.e., whether the transmission packet is successfully transmitted or not). Additionally, the transmission module 120 is configured to calculate a transmission error rate according to the fact that the data transmission task succeeds or not. In one embodiment, the transmission module 120 periodically calculates the transmission error rate in every predetermined period (e.g., in every 1 second).

In this embodiment, said channel status substantially corresponds to receive signal strength indicator (RSSI) values of said wireless signals. The control module 140 determines whether the transmission channel is clear according to the RSSI values of said wireless signals and a present clear channel assessment (CCA) threshold value. In a case that the transmission channel is clear, the transmission packet stored in the storage module 130 is transmitted to at least one of the external devices via the transmission module 120. In one embodiment, the operation above is substantially the same as IEEE 802.11 CSMA/CA (carrier sense multiple access with collision avoidance) mechanism.

For example, in a case that the present CCA threshold value is −82 dBm, if the control module 140 receives a wireless signal with a RSSI value greater than −82 dBm (e.g., the RSSI value may be −81 dBm) via the receiving module 110, the control module 140 determines that the transmission channel is occupied, and therefore the access point AP1 abandons the data transmission task and do not transmit the transmission packet. On the other hand, if the control module 140 does not receive any wireless signal with the RSSI value greater than −82 dBm, the control module 140 determines that the transmission channel is clear, and therefore the access point AP1 processes the data transmission task.

In an idea condition, the access point AP1 is configured to bi-directionally and separately communicate with the workstation WS1 and the workstation WS3, and the access point AP2 is configured to bi-directionally communicate with the workstation WS2 (as shown in FIG. 1). The communication of the access point AP1 and the communication of the access point AP2 can be processed in the same time, so as to improve the throughput of the wireless network system. In other words, when the access point AP1 is bi-directionally communicating with the workstation WS1 or the workstation WS3, the access point AP2 can still bi-directionally communicate with the workstation WS2 in the same time.

However, in a condition that the density of the access points is relatively high (e.g., the interval between the access points AP1, AP2 is relatively short), since the CCA busy ranges BR1, BR2 of the access points AP1, AP2 are over-large (e.g., the CCA busy ranges BR1, BR2 are overlapped to each other), even the transmission powers of access points AP1, AP2 (e.g., respectively corresponding to the transmission ranges TR1, TR2 shown in FIG. 1) are decreased, the access points AP1, AP2 may still interfere with each other. For example, the access point AP1 may receive a wireless signal from the access point AP2 or workstation WS2, and accordingly determine that the transmission channel is occupied.

Thus, to avoid the access points AP1, AP2 interfering with each other, so as to improve the throughput of the wireless network system, the control module 140 in the access point AP1 can further configured to dynamically adjust the present CCA threshold value (i.e., adjust the CCA busy range BR1 of the access point AP1).

In this embodiment, to improve the throughput of the wireless network system, the control module 140 dynamically adjusts the present CCA threshold value according to the transmission error rate calculated by the transmission module 120. More specifically, in a case that the transmission error rate is lower than a predetermined lower bound (e.g., 1%), which indicates that there is a few collisions in the transmission process and the channel status of the transmission channel is relatively good, the control module 140 raises the present CCA threshold value (i.e., reduces the CCA busy range BR1), so as to avoid the access point AP1 being interfered by the wireless signal(s) of the access point AP2 and/or the workstation WS2 and abandoning the data transmission task. On the other hand, in a case that the transmission error rate is greater than a predetermined upper bound (e.g., 10%), which indicates that there is a great number of collisions in the transmission process and the channel status of the transmission channel is relatively bad, the control module 140 reduces the present CCA threshold value, so as to make the access point AP1 continuously abandon the data transmission task until the transmission channel becomes better (e.g., the transmission channel has less noise).

Through the operations depicted above, the present CCA threshold value can be adjusted to a suitable value. Accordingly, the access point AP1 can avoid abandoning the data transmission task due to the interferences of wireless signals from other access point(s) (e.g., the access point AP2) or other workstation (e.g., the workstation WP2) located beyond the cell size of itself. Moreover, the access point AP1 can also avoid overly raising the present CCA threshold value, so as to avoid increasing the transmission error rate and causing decay of the throughput of the wireless network system. Thus, the service quality of the wireless network can be efficiently improved.

In one embodiment of the present invention, the present CCA threshold value is adjusted between an upper bound of CCA threshold value and a lower bound of CCA threshold value. In the following paragraphs, details related to the upper bound of CCA threshold value and the lower bound of CCA threshold value are provided. However, the invention is not limited to the embodiment below.

In this embodiment, the control module 140 is configured to determine the upper bound of CCA threshold value, and dynamically adjust the present CCA threshold value according to the transmission error rate and the upper bound of CCA threshold value, so as to avoid the access point AP1 dismisses the wireless signal from the workstation WS1 or the workstation WS3 because the present CCA threshold value is overly raised.

On the other hand, the control module 140 is also configured to determine the lower bound of CCA threshold value, and dynamically adjust the present CCA threshold value according to the transmission error rate and the lower bound of CCA threshold value, so as to avoid the access point AP1 be interfered by wireless signals from other access point(s) (e.g., the access point AP2) or other workstation (e.g., the workstation WP2) located beyond the cell size of itself due to the fact that the present CCA threshold value is overly reduced.

In the following paragraphs, specific details about the upper bound of CCA threshold value and the lower bound of CCA threshold value are provided.

In one embodiment, the control module 140 is configured to determine the upper bound of CCA threshold value according to the RSSI values of the wireless signals from the workstations connected to the access point AP1 (i.e., the workstations WS1, WS3). In practice, the control module 140 searches (or determines) a minimum RSSI value from the RSSI values corresponding to the workstations WS1, WS3 (i.e., the RSSI values of the wireless signals of the workstations WS1, WS3), and serves the minimum RSSI value as the upper bound of CCA threshold value.

Through such operation, whenever the workstation WS1 or the workstation WS3 transmits the wireless signal, the access point AP1 can determine the transmission channel is occupied, and avoid process data transmission task in this period.

In one embodiment, the control module 140 acquires a minimum CCA threshold value of the access point AP1 according to a hardware configuration of the access point AP1 and acquires a minimum receiving sensitivity of the access point AP1 according to a service level of the access point AP1. Subsequently, the control module 140 compares the minimum CCA threshold value and the minimum receiving sensitivity, and serves the greater one of the minimum CCA threshold value and the minimum receiving sensitivity as the lower bound of CCA threshold value.

In practice, the control module 140 acquires the minimum CCA threshold value according to a present transmission power of the access point AP1, a maximum transmission power of the access point AP1, and a default CCA threshold value of the access point AP1. The present transmission power of the access point AP1 can be configured by a user. The maximum transmission power of the access point AP1 corresponds to the hardware capability of access point AP1. The default CCA threshold value of the access point AP1, for example, is a RSSI value of one wireless signal with a lowest transmission rate which can merely be decoded by the access point AP1.

For example, in a case that the default CCA threshold value of the access point AP1 is −82 dBm, the maximum transmission power of the access point AP1 is 20 dBm, and the present transmission power of the access point AP1 is 16 dBm, the minimum CCA threshold value is −82 dBm (the default CCA threshold value)+20 dBm (the maximum transmission power)−16 dBm (the present transmission power) =−78 dBm. It indicates that, when the present transmission power of the access point AP1 is reduced from the maximum transmission power (i.e., 20 dBm) to 16 dBm, the minimum CCA threshold value of the access point AP1 should be raised from the default CCA threshold value (i.e., −82 dBm) to −78 dBm.

In addition, the control module 140 acquires the minimum receiving sensitivity of the access point AP1 according to a minimum support rate of the access point AP1. The minimum support rate can be configured by a user. For example, the user can set the access point AP1 to only support the workstations with transmission rates equal to or greater than 48 Mbps, such that the access point AP1 will decline the connection request from the workstations with transmission rates lower than 48 Mbps.

In one embodiment, the control module 140 acquires the minimum receiving sensitivity of the access point AP1 corresponding to the minimum support rate of the access point AP1 through a lookup table which is, for example, recorded in IEEE standard 802.11-2007/2009. In one embodiment, the lookup table is illustrated as Table 1.

TABLE 1

| transmission rate | minimum receiving sensitivity |
|---|---|
| 54 Mbps | −65 dBm |
| 48 Mbps | −66 dBm |
| 36 Mbps | −70 dBm |
| 24 Mbps | −74 dBm |
| 18 Mbps | −77 dBm |
| 12 Mbps | −79 dBm |
| 9 Mbps | −81 dBm |
| 6 Mbps | −82 dBm |

Because that the access point AP1 only supports the workstations with transmission rates equal to or greater than a specific transmission rate, the lower bound of CCA threshold value can be the minimum receiving sensitivity corresponding to the specific transmission rate.

In addition, in one embodiment of the invention, the timing module 150 is configured to provide a trigger signal periodically (e.g., in every predetermined period (e.g., in every 1 second)) to the control module 140. After receiving the trigger signal, the control module 140 calculates the upper bound of CCA threshold value and the lower bound of CCA threshold value, and dynamically adjusts the present CCA threshold value between the upper bound of CCA threshold value and the lower bound of CCA threshold value. With such an operation, the control module 140 can periodically and dynamically adjusts the present CCA threshold value.

In the following paragraphs, more details of the AP1 are provided. However, the invention is not limited to the embodiment below.

Figure 3:
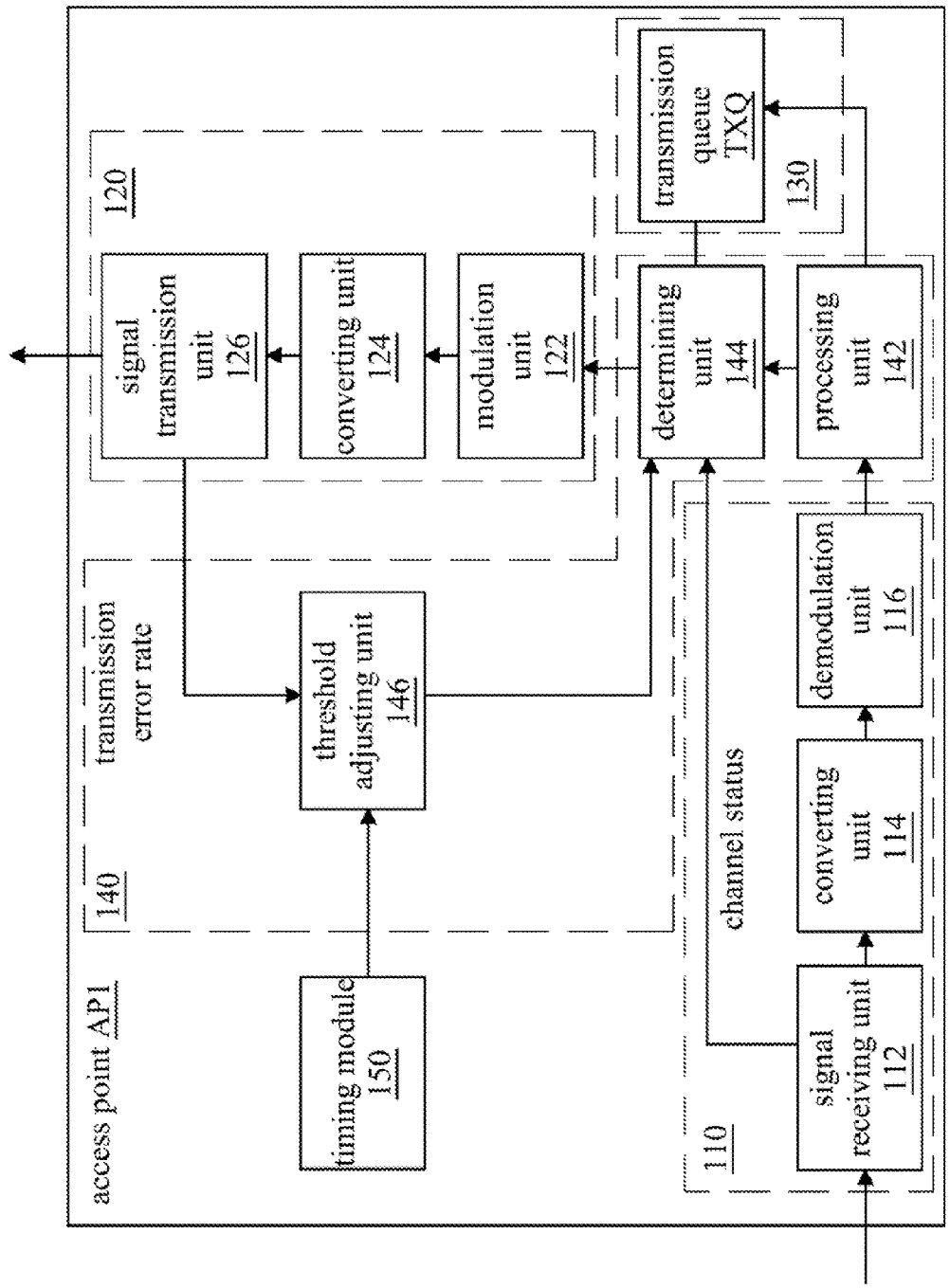
FIG. 3 is a schematic diagram of the access point in accordance with one embodiment of the present disclosure.

FIG. 3 is a schematic diagram of the access point AP1 in accordance with one embodiment of the present disclosure. In this embodiment, the functions (or operations) of the modules in the access point AP1 can be ascertained by referring to the embodiment above, and a description in this regard will not be repeated herein.

In this embodiment, the receiving module 110 includes a signal receiving unit 112, a converting unit 114, and a demodulation unit 116. The converting unit 114 is separately and electrically connected to the signal receiving unit 112 and the demodulation unit 116. All of the signal receiving unit 112, the converting unit 114, and the demodulation unit 116 can be realized by electronic circuits.

The signal receiving unit 112 is, for example, a radio frequency signal receiving unit. The signal receiving unit 112 is configured to receive the wireless signals from the external devices, and provide the wireless signals to the converting unit 114. In addition, the signal receiving unit 112 is configured to sense the channel status of the transmission channel of said wireless signals, and transmit the channel status to the control module 140. The details of sensing the channel status can be ascertained by referring to the paragraphs above, and a description in this regard will not be repeated herein.

The converting unit 114 is, for example, an analog-to-digital signal converter. The converting unit 114 is configured to receive the wireless signals with analog form from the signal receiving unit 112, convert the wireless signals with analog form to digital signals, and provide the digital signals to the demodulation unit 116.

The demodulation unit 116 is configured to demodulate the digital signals, and provide the demodulated digital signals to the control module 140.

The control module includes a processing unit 142, a determining unit 144, and a threshold adjusting unit 146. The determining unit 144 is electrically connected to the processing unit 142 and the threshold adjusting unit 146 separately. All of the processing unit 142, the determining unit 144, and the threshold adjusting unit 146 can be realized by a processing device, such as a central processor, a microprocessor, a programmable logic device, and a field-programmable gate array.

The processing unit 142 is configured to receive the demodulated digital signals, and correspondingly perform a control. In addition, the processing unit 142 is configured to generate the transmission packet, and store the transmission packet to transmission queue TXQ in the storage module 130. After the transmission packet is generated, the processing unit 142 provides a determining command to the determining unit 144.

The determining unit 144 is configured to receive the determining command and the channel status, and determine whether to transmit the transmission packet in the transmission queue TXQ according to the channel status and the present CCA threshold value. The details of the determination can be ascertained by referring to the paragraphs above, and a description in this regard will not be repeated herein.

The threshold adjusting unit 146 is configured to receive the transmission error rate from the transmission module 120, and dynamically adjust and update the present CCA threshold value according to the transmission error rate. The details of adjusting the present CCA threshold value can be ascertained by referring to the paragraphs above, and a description in this regard will not be repeated herein.

The transmission module 120 includes a modulation unit 122, a converting unit 124, and a signal transmission unit 126. The converting unit 124 is electrically connected to the modulation unit 122 and the signal transmission unit 126 separately. All of the modulation unit 122, the converting unit 124, and the signal transmission unit 126 can be realized by electronic circuits.

The modulation unit 122 is configured to receive the transmission packet from the determining unit 144, modulate the transmission packet, and provide the modulated transmission packet to the converting unit 124.

The converting unit 124 is, for example, a digital-to-analog signal converter. The converting unit 124 is configured to receive the modulated transmission packet from the modulation unit 122, convert the modulated transmission packet with digital form to an analog transmission packet, and provide the analog transmission packet to the signal transmission unit 126.

The signal transmission unit 126 is, for example, a radio frequency signal transmission unit. The signal transmission unit 126 is configured to receive the analog transmission packet from the converting unit 124, and transmit the analog transmission packet to at least one of the external devices. In addition, the signal transmission unit 126 is configured to determine whether the data transmission task of the analog transmission packet succeeds or not. In addition, the signal transmission unit 126 is configured to calculate the transmission error rate according to the fact that the data transmission task succeeds or not and transmit the transmission error rate to the threshold adjusting unit 146.

Another aspect of the present disclosure is an operating method of an access point. The operating method can be applied to an access point having a structure that is the same as or similar to the structure shown in FIG. 2. To simplify the description below, in the following paragraphs, the embodiment shown in FIG. 2 will be used as an example to describe the operating method according to an embodiment of the present disclosure. However, the invention is not limited to application to the embodiment shown in FIG. 2.

In addition, it should be noted that in the steps of the following operating method, no particular sequence is required unless otherwise specified. Moreover, the following steps also may be performed simultaneously or their execution times may partially overlap.

Figure 4:
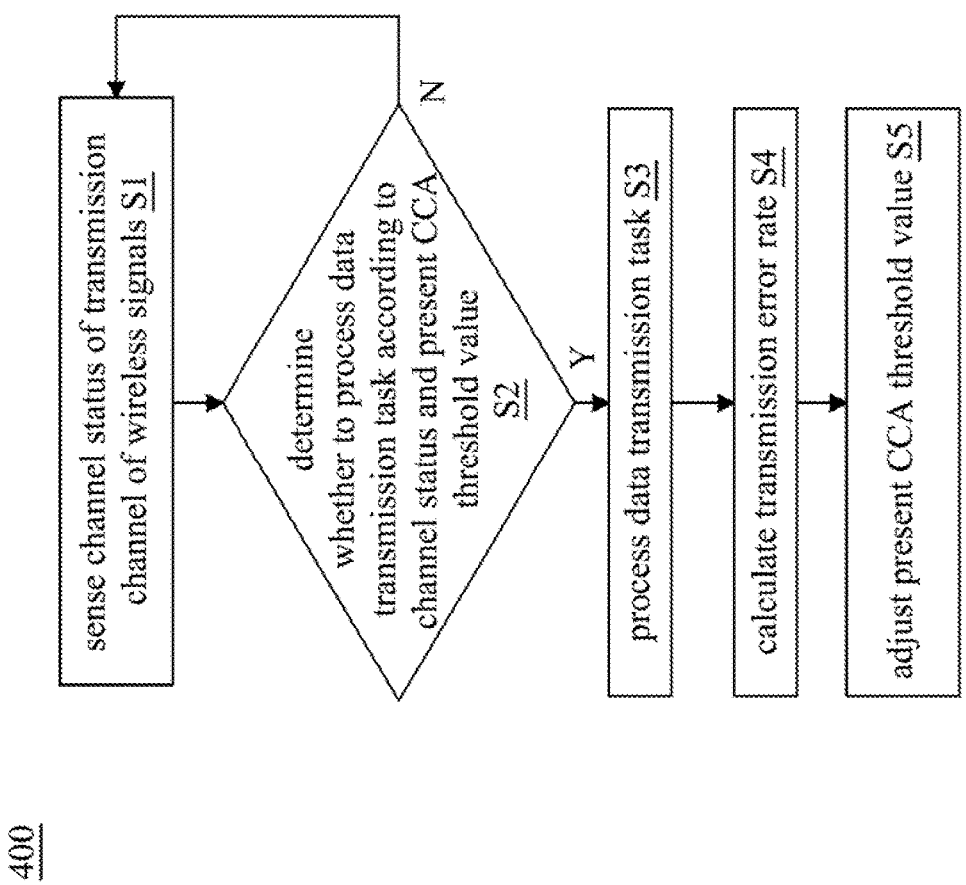
FIG. 4 is a flowchart of an operating method of an access point in accordance with one embodiment of the present disclosure.

FIG. 4 is a flowchart of an operating method 400 of the access point in accordance with one embodiment of the present disclosure. The operating method 400 includes steps S1-S5.

In step S1, the receiving module 110 senses the channel status of the transmission channel of the wireless signals.

In step S2, the control module 140 determines whether to process the data transmission task (e.g., to transmit the transmission packet to at least one of the external devices) through the transmission module 120 according to the channel status and the present CCA threshold value. If so, step S3 is performed. If not, the routine returns back to step S1.

In step S3, the control module 140 processes the data transmission task through the transmission module 120.

In step S4, the transmission module 120 calculates the transmission error rate according to the fact that the data transmission task succeeds or not.

In step S5, the control module 140 adjusts the present CCA threshold value according to the transmission error rate.

It should be noted that details of steps S1-S5 can be ascertained by referring to the previous aspect described above, and a description in this regard will not be repeated herein.

Through the operations depicted above, the present CCA threshold value can be adjusted to a suitable value. Accordingly, the access point AP1 can avoid abandoning the data transmission task due to the interferences of wireless signals from other access point(s) (e.g., the access point AP2) or other workstation (e.g., the workstation WP2) located beyond the cell size of itself. Moreover, the access point AP1 can also avoid overly raising the present CCA threshold value, so as to avoid increasing the transmission error rate and causing decay of the throughput of the wireless network system. Hence, the service quality of the wireless network can be efficiently improved.

Figure 5:
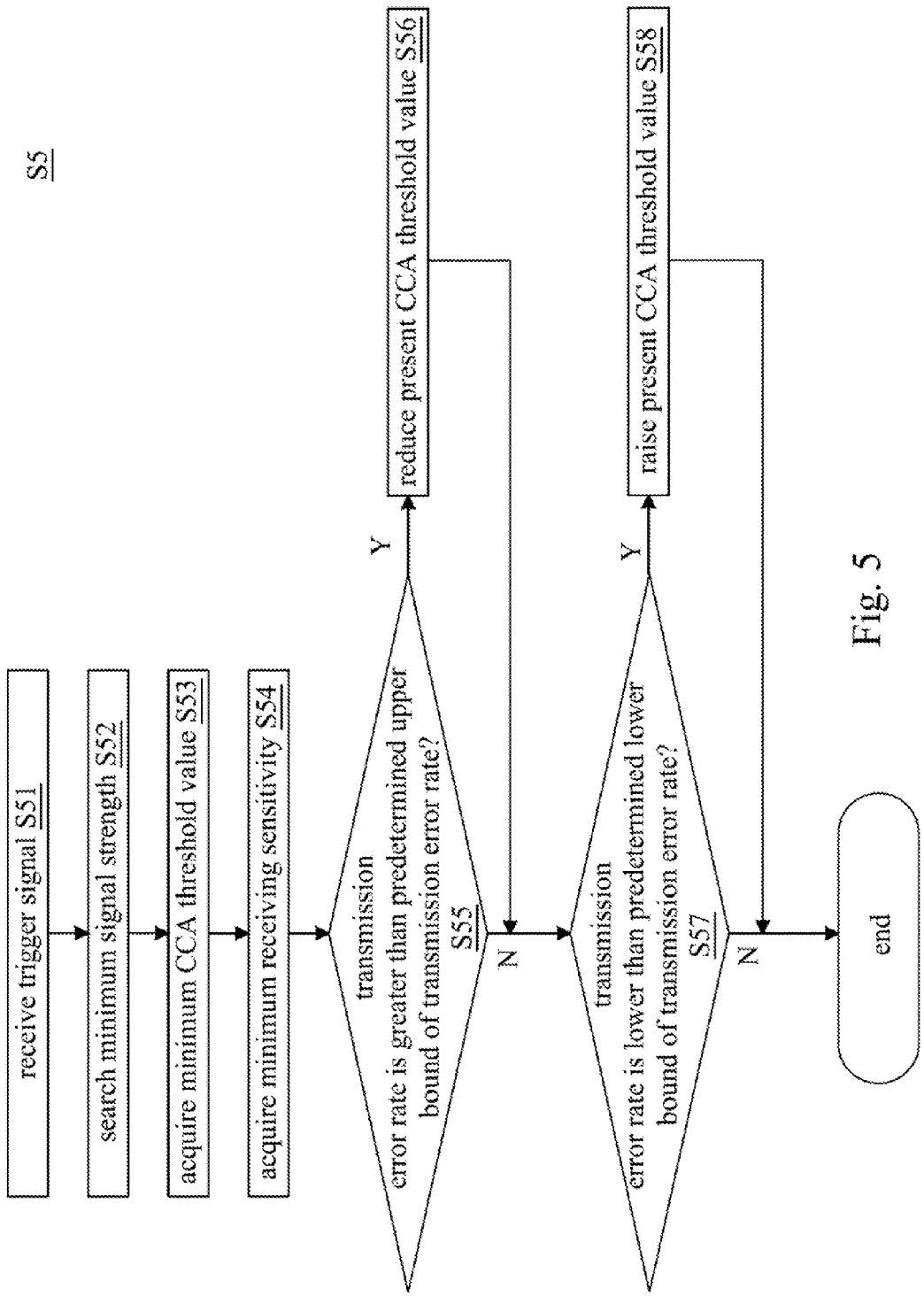
FIG. 5 is a specific flowchart of a step of the operating method of an access point in accordance with one embodiment of the present disclosure.

FIG. 5 is a specific flowchart of step S5 of the operating method 400 of an access point in accordance with one embodiment of the present disclosure. In this embodiment, the step S5 includes steps S51-S58.

In step S51, the control module receives the trigger signal from the timing module 150.

In step S52, after receiving the trigger signal, the control module 140 searches a minimum signal strength from a plurality of signal strengths of the wireless signals corresponding to the workstations connected to the access point AP1 to serve as the upper bound of CCA threshold value.

In practice, the signal strengths of the wireless signals can be the RSSI values of the wireless signals, and the control module 140 searches (or determines) the minimum RSSI value from the RSSI values of wireless signals corresponding to the workstations connected to the access point AP1 to serve as the upper bound of CCA threshold value.

In step S53, the control module 140 acquires the minimum CCA threshold value of the access point AP1 according to the hardware configuration of the access point AP1.

In practice, the hardware configuration of the access point AP1 includes the present transmission power of the access point AP1, the maximum transmission power of the access point AP1, and the default CCA threshold value of the access point AP1. The control module 140 acquires the minimum CCA threshold value of the access point AP1 according to the present transmission power of the access point AP1, the maximum transmission power of the access point AP1, and the default CCA threshold value of the access point AP1. Details of the calculation can be ascertained by referring to the previous aspect, and a description in this regard is not repeated herein.

In step S54, the control module 140 acquires the minimum receiving sensitivity of the access point AP1 according to the service level of the access point AP1.

In practice, the service level includes the minimum support rate of the access point AP1. The control module 140 acquires the minimum receiving sensitivity of the access point AP1 corresponding to the minimum support rate of the access point AP1 through a lookup table in IEEE standard 802.11-2007/2009. The lookup table, for example, is illustrated as Table 1 above.

In step S55, the control module 140 determines whether the transmission error rate is greater than the predetermined upper bound of the transmission error rate (e.g., 10%). If so, step S56 is performed. If not, step S57 is performed.

In step S56, in a case that the transmission error rate is greater than the predetermined upper bound of the transmission error rate, the control module 140 serves the greater one of the minimum CCA threshold value and the minimum receiving sensitivity as the lower bound of CCA threshold value. Subsequently, the control module 140 reduces the present CCA threshold value (e.g., reduces 2 dB) with a restriction that the present CCA threshold value is not lower than the lower bound of CCA threshold value.

In step S57, the control module 140 determines whether the transmission error rate is lower than the predetermined lower bound of the transmission error rate (e.g., 1%). If so, step S58 is performed. If not, step S5 is finished.

In step S58, in a case that the transmission error rate is lower than the predetermined lower bound of the transmission error rate, the control module 140 raises the present CCA threshold value (e.g., raises 2 dB) with a restriction that the present CCA threshold value is not greater than the upper bound of CCA threshold value (i.e., the minimum RSSI value).

It should be noted that, the order between steps S52, S53, and S54 can be alternated, and the order between steps S52, S53, and S54 is not limited by the order illustrated in FIG. 5.

Through the operations depicted above, it can avoid the present CCA threshold value being overly raised, so as to avoid the access point AP1 dismissing the wireless signal from the workstation WS1 or the workstation WS3. In addition, it can also avoid the present CCA threshold value being overly reduced, so as to avoid the access point AP1 be interfered by wireless signals from other access point(s) (e.g., the access point AP2) or other workstation (e.g., the workstation WP2) located beyond the cell size of itself To facilitate the operating method 400 described above to be understood, an operative example is provided in the following paragraph.

Figure 6:
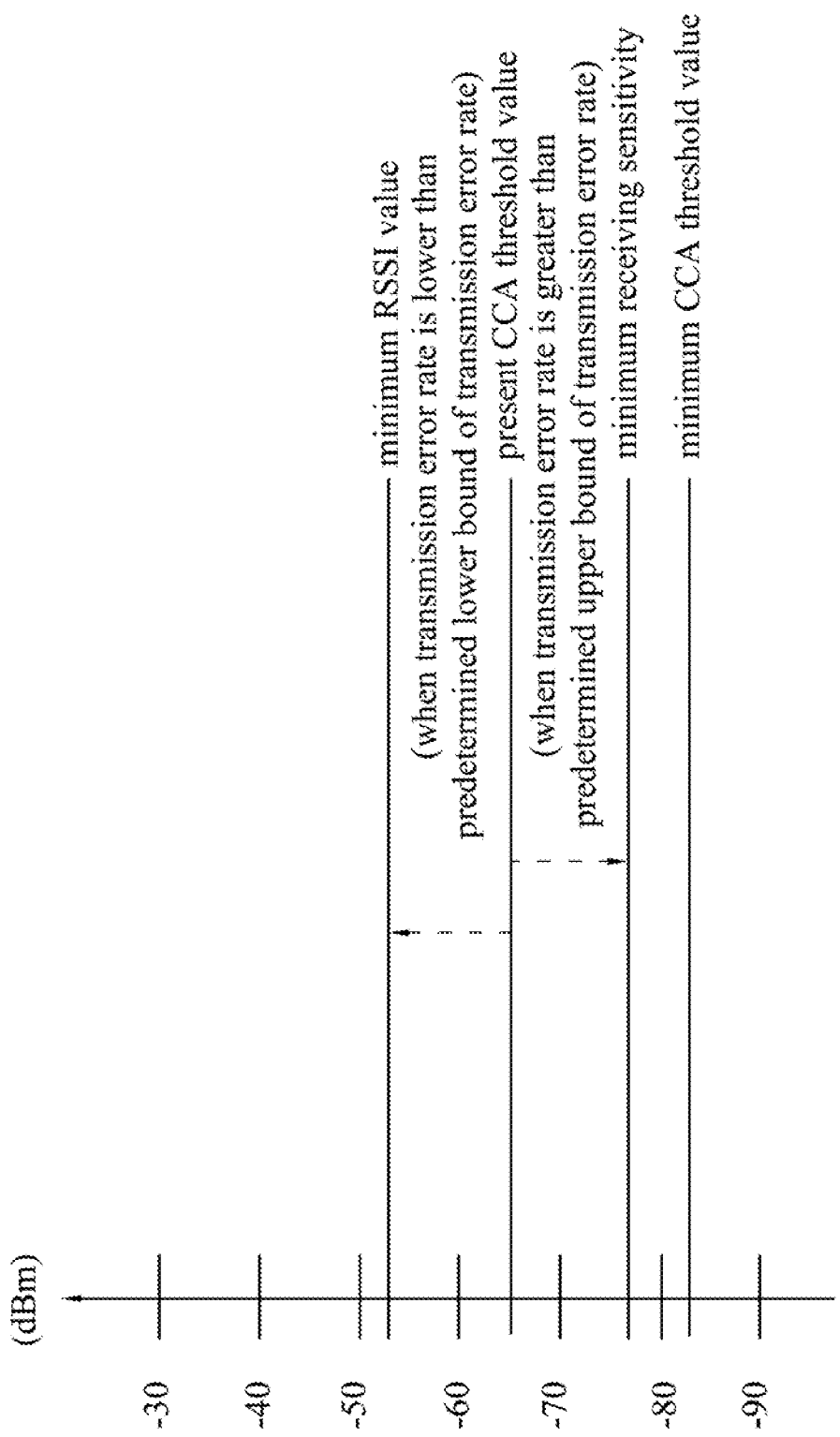
FIG. 6 is a diagram illustrating an exemplary embodiment of the present disclosure.

FIG. 6 is a diagram illustrating an exemplary embodiment of the present disclosure. In this embodiment, the present CCA threshold value of the access point AP1 is, for example, −65 dBm, the minimum RSSI value is, for example, −52 dBm, the minimum receiving sensitivity is, for example, −78 dBm, and the minimum CCA threshold value is, for example, −82 dBm. When the transmission error rate is lower than the predetermined lower bound of the transmission error rate, the control module 140 can raise the present CCA threshold value with a restriction that the present CCA threshold value is not greater than the minimum RSSI value. When the transmission error rate is greater than the predetermined upper bound of the transmission error rate, the control module 140 can reduce the present CCA threshold value with a restriction that the present CCA threshold value is not lower than the minimum receiving sensitivity and the minimum CCA threshold value.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An operating method applied to an access point, wherein the access point is configured to be connected with a plurality of workstations, and the access point comprises a transmission module and a receiving module, the operating method comprising following steps:
    sensing, through the receiving module, a channel status of a transmission channel between the access point and the workstations;
    determining whether to process a data transmission task through the transmission module according to the channel status and a present clear channel assessment (CCA) threshold value;
    calculating, through the transmission module, a transmission error rate according to the fact that the data transmission task succeeds or not;
    determining a minimum received signal strength indicator (RSSI) value from a plurality of RSSI values corresponding to the workstations to serve as an upper bound of CCA threshold value; and
    dynamically adjusting the present CCA threshold value according to the transmission error rate and the upper bound of CCA threshold value.

2. The operating method as claimed in claim 1, wherein the step of dynamically adjusting the present CCA threshold value according to the transmission error rate comprises:
    determining a lower bound of CCA threshold value; and
    dynamically adjusting the present CCA threshold value according to the transmission error rate and the lower bound of CCA threshold value.

3. The operating method as claimed in claim 2, wherein the step of determining the lower bound of CCA threshold value comprises:
    acquiring a minimum CCA threshold value of the access point according to a hardware configuration of the access point;
    acquiring a minimum receiving sensitivity of the access point according to a service level of the access point; and
    serving the minimum CCA threshold value or the minimum receiving sensitivity as the lower bound of CCA threshold value.

4. The operating method as claimed in claim 3, wherein the hardware configuration comprises a present transmission power of the access point, a maximum transmission power of the access point, and a default CCA threshold value of the access point.

5. The operating method as claimed in claim 3, wherein the service level comprises a minimum support rate of the access point, and the step of acquiring the minimum receiving sensitivity of the access point according to the service level of the access point comprises:
    acquiring the minimum receiving sensitivity of the access point corresponding to the minimum receiving sensitivity of the access point through a lookup table.

6. The operating method as claimed in claim 1, wherein the step of dynamically adjusting the present CCA threshold value according to the transmission error rate comprises:
    adjusting the present CCA threshold value according to the transmission error rate, a plurality of RSSI values corresponding to the workstations, a hardware configuration of the access point, and a service level of the access point.

7. The operating method as claimed in claim 1, wherein the step of dynamically adjusting the present CCA threshold value according to the transmission error rate comprises:
    determining whether the transmission error rate is greater than a predetermined upper bound of the transmission error rate;
    reducing the present CCA threshold value in a case that the transmission error rate is greater than the predetermined upper bound of the transmission error rate;
    determining whether the transmission error rate is lower than a predetermined lower bound of the transmission error rate; and
    raising the present CCA threshold value in a case that the transmission error rate is lower than the predetermined lower bound of the transmission error rate.

8. An access point configured to be connected with a plurality of workstations, the access point comprising:
    a receiving module configured to sense a channel status of a transmission channel between the access point and the workstations;
    a transmission module configured to process a data transmission task and calculate a transmission error rate according to the fact that the data transmission task succeeds or not; and
    a control module configured for:
        determining whether to process the data transmission task through the transmission module according to the channel status and a present CCA threshold value;
        searching a minimum received signal strength indicator (RSSI) value from a plurality of RSSI values corresponding to the workstations to serve as an upper bound of CCA threshold value; and
        dynamically adjusting the present CCA threshold value according to the transmission error rate and the upper bound of CCA threshold value.

9. The access point as claimed in claim 8, wherein the control module is further configured for:
    determining a lower bound of CCA threshold value; and
    dynamically adjusting the present CCA threshold value according to the transmission error rate and the lower bound of CCA threshold value.

10. The access point as claimed in claim 9, wherein the control module is configured for:
    acquiring a minimum CCA threshold value of the access point according to a hardware configuration of the access point;

acquiring a minimum receiving sensitivity of the access point according to a service level of the access point; and serving the minimum CCA threshold value or the minimum receiving sensitivity as the lower bound of CCA threshold value.

11. The access point as claimed in claim 10, wherein the hardware configuration comprises a present transmission power of the access point, a maximum transmission power of the access point, and a default CCA threshold value of the access point.

12. The access point as claimed in claim 10, wherein the service level comprises a minimum support rate of the access point, and the control module is further configured to acquire the minimum receiving sensitivity of the access point corresponding to the minimum receiving sensitivity of the access point through a lookup table.

13. The access point as claimed in claim 8, wherein the control module is configured for:

adjusting the present CCA threshold value according to the transmission error rate, a plurality of RSSI values corresponding to the workstations, a hardware configuration of the access point, and a service level of the access point.

14. The access point as claimed in claim 8, wherein the control module is configured for:

determining whether the transmission error rate is greater than a predetermined upper bound of the transmission error rate, and reducing the present CCA threshold value in a case that the transmission error rate is greater than the predetermined upper bound of the transmission error rate; and determining whether the transmission error rate is lower than a predetermined lower bound of the transmission error rate, and raising the present CCA threshold value in a case that the transmission error rate is lower than the predetermined lower bound of the transmission error rate.

15. The access point as claimed in claim 8 further comprising:

a timing module configured to periodically provide a trigger signal to the control module, the control module periodically adjust the present CCA threshold value accordingly.

* * * * *